United States Patent [19]

Ghavi

[11] Patent Number: 4,818,114

[45] Date of Patent: Apr. 4, 1989

[54] SHAKER TOP FOR BABY BOTTLES

[76] Inventor: Melinda M. Ghavi, 10726 Randy La., Cupertino, Calif. 95014

[21] Appl. No.: 61,431

[22] Filed: Jun. 12, 1987

[51] Int. Cl.$^4$ .......................... A47J 43/27; A61J 9/081
[52] U.S. Cl. .................................... 366/130; 215/11.1; 215/DIG. 8; 220/1 E
[58] Field of Search ............................ 215/11 R–11 E, 215/228, DIG. 8, 11.1–11.6; 220/1 E; 366/129, 130, 219, 240

[56] References Cited

U.S. PATENT DOCUMENTS

| | | | |
|---|---|---|---|
| 1,201,284 | 10/1916 | Gilchrist | 220/1 E X |
| 1,672,466 | 6/1928 | Oshman et al. | 215/11 R |
| 1,672,467 | 6/1928 | Oshman et al. | 215/11 R |
| 2,752,971 | 7/1956 | Tupper | 215/11 R X |
| 3,323,276 | 6/1967 | Thomas | 215/11 C X |
| 3,530,979 | 9/1970 | Merrill, Jr. et al. | 215/11.6 X |
| 3,747,414 | 7/1973 | Ohno | 73/428 |
| 3,820,692 | 6/1974 | Swett et al. | 366/129 X |
| 4,003,555 | 1/1977 | Swartz | 259/54 |
| 4,065,107 | 12/1977 | Van Horbek | 366/343 |
| 4,101,042 | 7/1978 | Strong et al. | 215/11 R |
| 4,208,136 | 6/1980 | King | 366/338 |
| 4,613,050 | 9/1986 | Atkin et al. | 215/118 |

FOREIGN PATENT DOCUMENTS 2908526  4/1980  Fed. Rep. of Germany ...... 366/130

OTHER PUBLICATIONS

Tupperware, "The Tupperware Collection", vol. 2, #2, Summer 1987, form #51710(487), p. 17, item No. 622--Quick Shake.

Primary Examiner—Sue A. Weaver

[57] ABSTRACT

A device that can be attached to a baby bottle to facilitate the mixing of solid food particles into liquid. The shaker top comprises a circular-dome shaped mixing chamber (12) with internal screwthreads (24) on the interior wall of said chamber that are proportioned and dimensioned to accommodate the attachement of the shaker top to a baby bottle. Support wedges (34) are formed above the internal screwthreads on the inside wall of said chamber to provide a means of internally retaining a mixing disc (10). Said mixing disc is comprised of a plurality of uniformly spaced arms (20) radiating from a center post (22) which acts as a handle to ease the insertion and removal of the disc member. The arms of the mixing disc are diamond shaped to produce a multitude of shear points (40) which increase the cutting action during the shaking process. This design discourages the sticking of wetted food particles in small crevices, avoids the unnecessary loss of milk solids and aides in the cleaning process, outer rim of the disc member (30) is dimensioned to snap-fit into the support wedges inside the mixing chamber. The mixing disc is positioned to accommodate the movement of the liquids and food particles from the baby bottle, through the disc member, into the mixing chamber and back into the bottle. This action will facilitate the rapid dispersion of the solids into the liquid from both sides of the mixing disc.

15 Claims, 2 Drawing Sheets

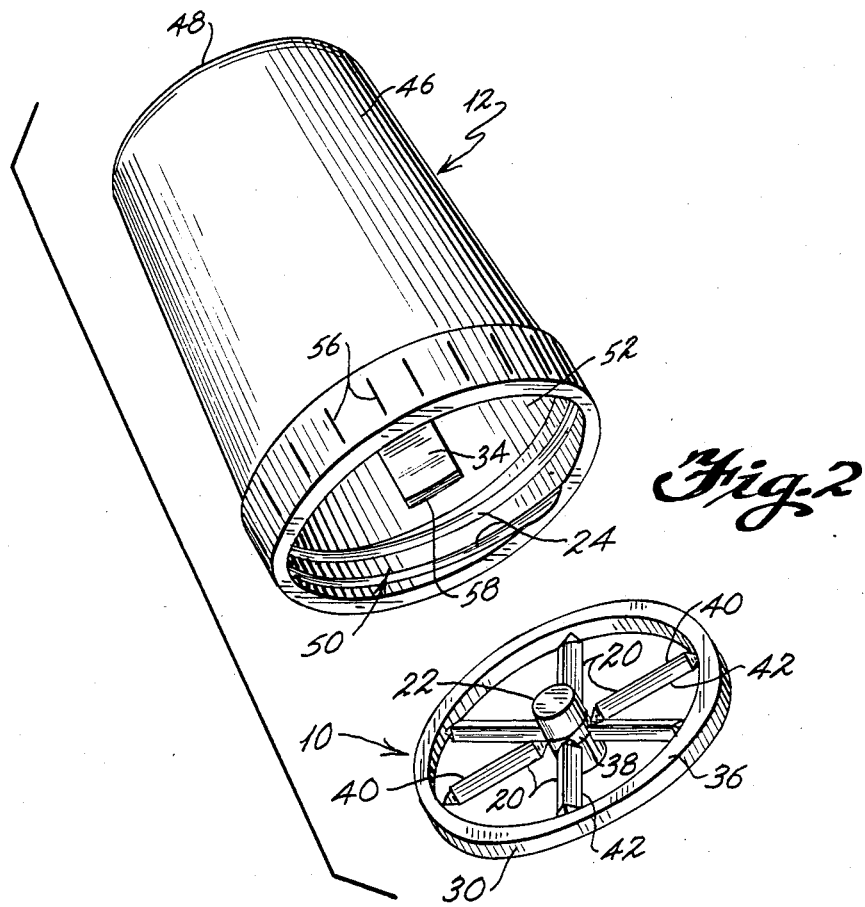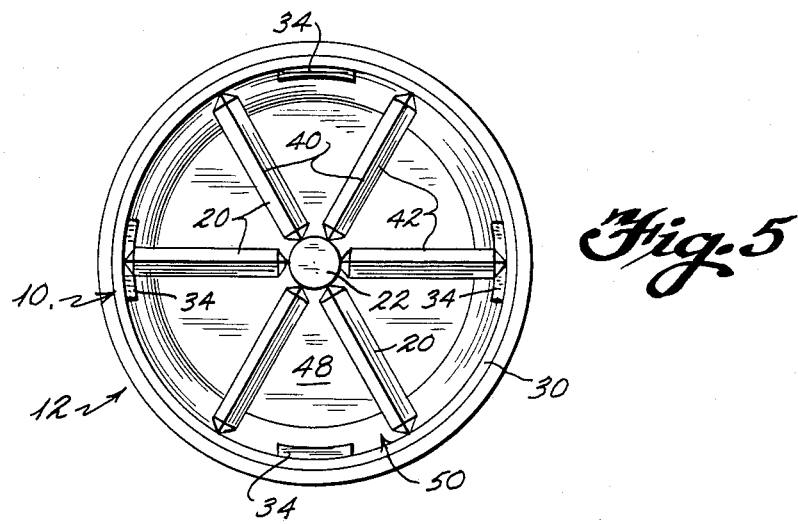

SHAKER TOP FOR BABY BOTTLES

BACKGROUND

1. Field of Invention

This invention relates to shaker tops, and more particularly, to shaker tops designed to attach to baby feeding bottles to facilitate the mixing of solids and liquids of beverages that require thorough dispersion of the solid components into the liquid components thereof.

2. Description of Prior Art

The current method of preparing formula in a baby bottle involves many steps. First, water must be boiled, allowed to cool to approximately 100 degrees and poured into baby bottles. Bottled purified water can be substituted. The solid, a powdered milk preparation, is then dropped directly into the liquid. Shaking of the mixture in the bottle is only readily enabled by provision and fitting of a closure flat disc in place of the nipple in a nipple ring since shaking with a nipple in place is likely to cause milk to be shaken out threw the nipple opening.

It is well known that some powdered or particle type solids, such as solid protein food particles found in powdered baby formula, when wetted tend to lump and do not readily disperse into liquids. Even after long shaking, undispersed solids remain in the form of floating lumps. To avoid this requires long term shaking, straining, or heating of liquid to aid in the dissolving process. These undissolved particles can plug the nipple opening and ingestion of these lumps can cause stomach upset in small infants.

Using warm, boiled water facilitates the dispersion of the milk particles into the liquid but the steam from the water tends to make the dry formula stick to the measuring cup as it is poured into the warm water. Before the measuring cup can be returned to the dry milk can, it should be washed and dried to prevent the unused formula from becoming contaminated. Additionally, when the formula is prepared using warm water, an increased risk of bacterial decay and loss of nutrients is present as the spoilage process is encouraged the moment the formula comes in contact with the warmth of the water. The prepared milk must be used immediately or refrigeraated and used within 24 to 48 hours according to the formula manufacturer's directions. Extra care must be taken to prevent the prepared bottle from being reheated more than once.

Since boiling kills bacteria but does not remove all harmful chemicals from water, purified or distilled bottled water offers greater protection from an infant's delicate digestion system.

However, using cool bottled or boiled water makes the dispersion of the milk particles into the liquid more difficult. Merely shaking the contents in a closed bottle, as is presently done, does not efficiently disperse the formula into the water. Several varieties of prior art mixing apparatuses are known and disclosed. One such device, U.S. Pat. No. 3,747,414 refers to a basket to disperse powdered milk. This device does not provide a mixing chamber, however, which would allow movement of the fluid to facilitate the break-up of the particles. The basket would displace the milk when preparing a full 8-ounce bottle, further decreasing the movement of the liquid and a potential cause for spillage. Also, the basket has many small openings which would be difficult to clean, a factor of major significance to mothers. U.S. Pat. No. 4,613,050 provides for a means to mix formula but this device would not fit a standard size baby bottle sold in the U.S. Additionally, no means is provided, such as a shaking disc, to disperse the milk particles other than the shaking motion, which does not satisfactorily solve the problem. Other mixing devices known, such as U.S. Pat. No. 4,003,555 and the container marketed by Tupperware called the Quick-Shake might effectively disperse the milk lumps but these containers are not designed to adapt to a baby bottle. The use of these devices would require the sterilization of the shaker container and parts after each use in addition to the sterilization of the baby bottle. Since time is at a premium for parents, this extra device to be washed and sterilized would greatly discourage it's use. And the extra handling and pouring of the prepared formula would expose it to an increased chance of contamination. Further, the design of the shaking disc found in the Tupperware Quick-Shake is such that food particles tend to stick inside the grooves of the arms of the disc causing a loss of formula and difficulty in cleaning.

Most users, therefore, would find it desirable to have a tool to attached directly to a baby bottle that would efficiently disperse the powdered formula into the water.

OBJECTS AND ADVANTAGES

Accordingly, it is an object of this invention to provide a shaker top to attach directly to baby bottles which is arranged to effect maximum rapid break up of the solids on shaking and thereby avoid the sterilization and subsequent cleaning of an additional shaker device to accomplish said results.

Another principal object of this invention is to provide a shaker top of the above character in which upon removal of the device, the blended milk remains in the baby bottle and is then ready for the attachement of a nipple assembly for feeding which by eliminating a transferring step reduces the risk of contamination of the sterile milk. Another principal object of this invention is to provide a shaker top of the above character that incorporates the use of a mixing chamber to allow impingement against chamber walls thereby increasing the dispersion of the food particles into the liquid.

Another principal object of this invention is to provide a shaker top of the above character that incorporates the use of an improved stationary disc with a plurality of arms designed to increase the fragmentation of food particles into a liquid thereby producing a mixed beverage free from undissolved solids.

Another principal object of this invention is to provide a shaker top of the above character that allows the mixing of formula in a baby bottle without the use of heated water thereby protecting the freshness of the resulting beverage.

Another principal object of this invention is to provide a shaker top of the above character in which upon removal of the shaker top, the mixing disc is carried within the mixing chamber for application to another bottle without the need to touch the disc which eliminates possible contamination.

The above mentioned objects are accomplished, according to this invention, by a shaker top comprising of a circular-dome shaped mixing chamber with internal threads which would match the external threads found on the rim of a standard size baby feeding bottle thereby allowing the shaker top to be screwed onto the bottle to prevent any spilling or leaking. Inside the mixing chamber situated above the internal threads is a series of uniformly spaced wedges formed to act as a support means for a stationary mixing disc. The disc member would be frictionally retained inside the mixing chamber in a push-fit motion and would be positioned directly above the rim of a baby bottle when assembled shaker top is attached to said bottle. The mixing disc is comprised of a plurality of uniformly spaced arms radiating from a center post, which acts as a handle to ease the insertion and removal of the disc member into the mixing chamber, and connect to a circular rim on the disc which keeps the arms in a horizontal position. The arms of the mixing disc are diamond shaped to produce a multitude of shear points which increase the cutting action during the shaking process. This design discourages the sticking of wetted food particles in small crevices, avoids the unnecessary loss of milk solids and aides in the cleaning process. The outer rim of the disc member is shaped to provide a snap fit into the support means in the mixing chamber and dimensioned accordingly. The disc member is shaped and positioned to accommodate the movement of the liquids and food particles from the baby bottle, through the disc member, into the mixing chamber and back to the bottle. This action will facilitate the break up of solids and dispersion of the solids in the liquid from both sides of the mixing disc.

With the liquids to be mixed placed in the bottle and the solids to be mixed poured into the liquid, the mixing disc member is fitted into the mixing chamber dome and the assembled shaker unit is screwed onto the baby bottle. Upon shaking the bottle with the shaker top attached, the solids are exposed to and broken up by the liquids within the shaker, and when shaking is completed, removal of the shaker top exposes the fully blended formula in the baby bottle ready for the attachment of the nipple assembly. The formula has not left the feeding vessel, i.e. baby bottle, which reduces the chance of contamination and since warm water was not used in the preparation, the formula has not been exposed to heat to preserve it's freshness. The mixing disc is retained inside the mixing chamber upon removal of the shaker top and is ready for application to anther baby bottle without needing to touch the disc which could again expose the mile to contamination. Further the shaker top may be rested in an upright position that allows the remaining fluid to drip into the mixing chamber or left attached to the bottle for storage in the refrigerator.

Other objects, uses, and advantages will be obvious or become apparent from a consideration of the following detailed description and application drawings.

DRAWINGS FIGURES

FIG. 1 is an exploded view of a preferred embodiment of the invention and discloses the primary use wherein the assembled shaker top 14, comprising of a mixing chamber 12 and a mixing disc 10, attached to a baby bottle 16;

FIG. 2 is a perspective view of the mixing chamber 12 and mixing disc 10;

FIG. 5 is a bottom view of the assembled shaker top 14.

Figure 1:
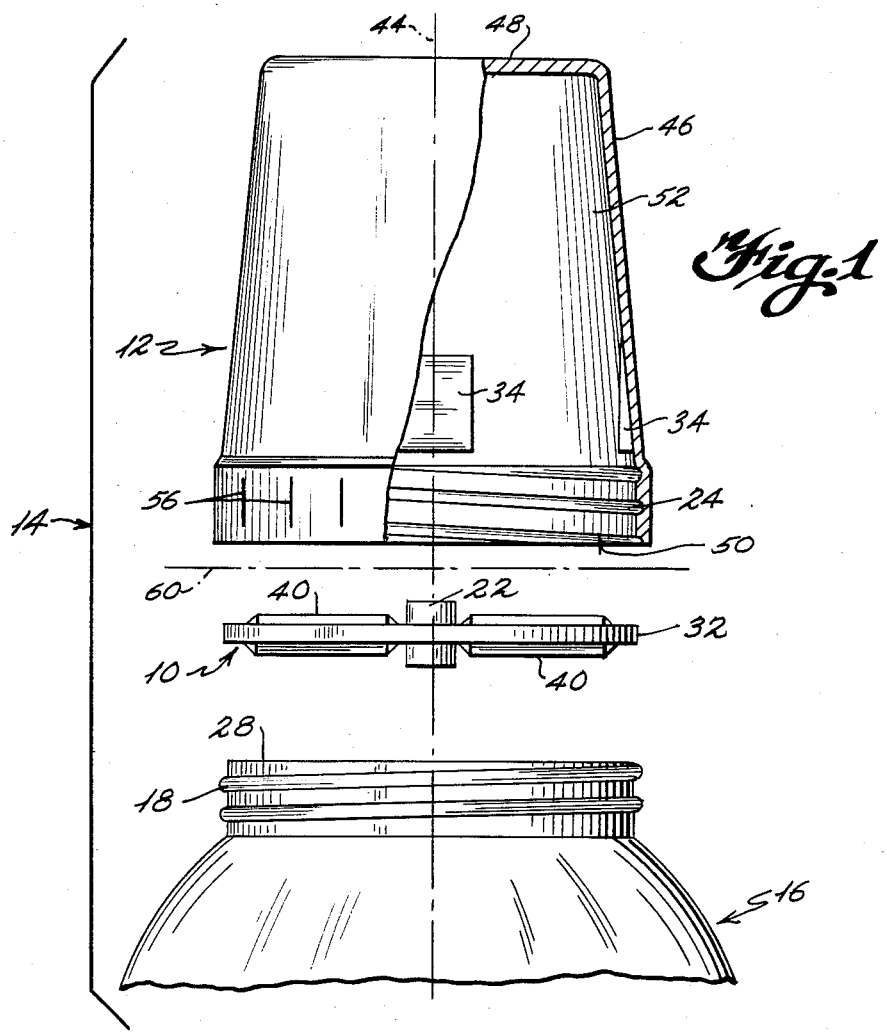
Figure 3:
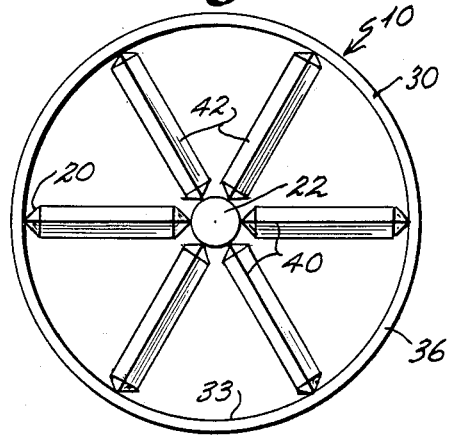
FIG. 3 is a top and/or bottom view (both sides are same) of the mixing disc 10.
Figure 4:
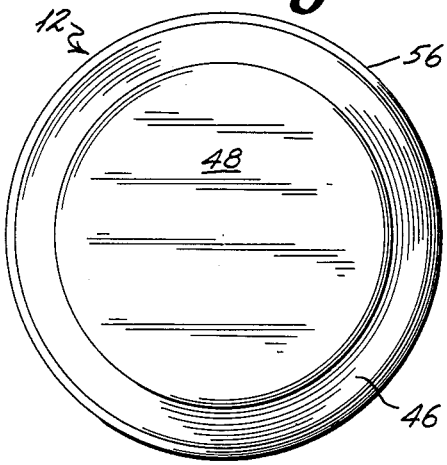
FIG. 4 is a top view of the mixing chamber 12.

However, it is to be understood that the specific drawing illustrations provided are supplied primarily to comply with the requirements of the Patent Laws, and that the invention is susceptible of other embodiments which will be obvious to those skilled in the art, and which are intended to be covered by the appended claims.

DRAWING REFERENCE NUMERALS 10 mixing disc
12 mixing chamber
14 shaker top
16 baby bottle
18 external threads on baby bottle
20 arm on mixing disc
22 center post on mixing disc
24 internal threads of mixing chamber
28 rim of baby bottle
30 outer rim of disc
32 outside wall of rim on disc
33 inside wall of rim on disc
34 support wedges
36 top/bottom of rim on disc
38 arm support means
40 shear pooints
42 side of arm on disc
44 longitudinal axis
46 chamber walls
48 chamber top
50 chamber bottom
52 inner surface of chamber
56 handling indentions on chamber
58 base of support wedge
60 horizontal plane

DETAILED DESCRIPTION OF A PREFERRED EMBODIMENT OF THE INVENTION

Reference numeral 14 in FIG. 1 generally indicates a shaker top embodying this invention. It comprises a mixing chamber 12 of a circular domal configuration and a mixing disc 10 of circular configuration with a plurality of uniformly spaced arms 20 radiating from a center post 22 which facilitates the insertion and removal of the mixing disc 10 with the mixing chamber 12. FIG. 1 discloses the primary use of the shaker top 14 wherein the internal threads of the mixing chamber 24 permit attachment by utilizing the external threads 26 found on the rim of a standard baby bottle 28.

Referring now specifically to the details of the mixing disc 10 in FIGS. 1, 2, 3 and 5, it can be seen that the outer rim 30 is of a circular configuration with a diameter slightly greater than the diameter of the area between the support wedges 34. Any reference made to the top or bottom of the disc is for explanatory reasons as the disc is reversible and either side can be representative of the top/bottom as it is inserted into the mixing chamber 12. The diameter of the rim 30 is proportioned to recess and fit within the interior of the mixing chamber 12. The thickness of the side of the rim 32 is such to allow it to provide contact and support when positioned in the support wedges 34 within the mixing chamber 12. The top/bottom of the rim 36 is wide enough to support and provide strength to the arms 20 extending from the inside wall of the rim 33. The elongated arms on the disc 20 are diamond shaped and extend inwardly from the inside rim 33 to the arm support means 38 formed to the center post 22. The arms 20 are tapered on both ends where it attached by use of a flange to the inside rim 33 and the arm support means 38 on the center post 22. The peaks of the diamond-shaped arms produce shear points 40 to facilitate the fragmentation of food particles. All four sides of the arms 42 between the shear points 40 slope at a 45 degree angle from a horizontal plane, 90 degrees from each adjoining side, to meet with the next shear point 40. This produces a smooth, straight surface to discourage food particles from stikcing to the arms 20. The arm support means 38, which is formed to the center post 22, is of such thickness as to provide strength and support for the attaching tapered arm 20 and to prevent the arms 20 from detaching when submitted to the stress that occurs in the shaking process. The center post 22 is positioned along the longitudinal axis 44 and is perpendicular to the rim of the disc 30. The center post 22 is of such a length and diameter as to act as a handle to facilitatew the grasping and positioning of the disc 10 inside the mixing chamber 12. The entire mixing disc 10 is an integral one-piece design.

Referring now specifically to the details of the mixing chamber 12, in FIGS. 1, 2, 4 and 5, the chamber is essentially of a domal configuration. The chamber 12 is formed to define an encompassing or circumambient side wall 46, a higher circular wall which closes off the top 48 of the mixing chamber 12 with the circular end of the chamber 50 being open and having the circumference of a baby bottle to enable the attachment of the shaker top 14 to the bottle. Circling the bottom of the chamber 50 is a series of columnar indentions 56 which aides in the twisting motion to attach the shaker top 14. The chamber 12 on its inner surface is formed to define interrupted screwthreads 24 near the lower rim of the chamber 50. These screwthreads 24 are proportioned to accommodate the proper fit to a baby bottle to prevent leakage and spillage during the shaking process. Positioned immediately above the screwthreads 24 on the inner circumambient chamber wall 46 is a series of uniformly spaced support wedges 34 (four in the preferred embodiment) provided to hold the mixing disc 10 in place after insertion. These support wedges 34 are outwardly directed and proportioned such that when the mixing disc 10 is received within the mixing chamber 12 the disc is held in jam-fitting-relation, thereto when the mixing chamber 12 is removed from the baby bottle 16, the disc is held in place. The base of the support wedge 58 extends from the inside wall of the mixing chamber 46 parallel to the horizontal plane 60. The support wedge 34 terminates in an upwardly directed surface and blends into the circular surface of the wall 46. The circumference of the plane touching these support wedges 34 is slightly smaller than the circumference of the mixing disc 10 and is proportioned so that the disc 10 is frictionally retained therein in jam-fitting-relation to the chamber 12. The circumference of the walls of the chamber 46 gradually decreases as they rise to the chamber top 48 in a frusto-conical shape. The chamber top 48 hence has a smaller circumference than the chamber bottom 50 thereby facilitating the action of the liquid and solid constituents of the beverage during shaking. The chamber top 48 is flat and is parallel to the horizontal plane. This configuration of the chamber top 48 provides a rest surface which allows the shaker top 14 to be inverted and rested in an upright position that automatically allows the remaining beverage to drain inside the chamber 12. The thickness of the mixing chamber wall 46 and top 48 is relatively small and is such as to provide sufficient strength and durability for it's intended use.

The mixing chamber 12 and the mixing disc 10 are preferably formed from suitable plastic materials adapted for economical injection molding procedures. The plastic should be boilable to enable the sterilization of the device. The material is preferably of a semi-rigid plastic as this provides the necessary flex for the snap action of the disc when fitted in the mixing chamber 12. Transparency of the mixing chamber 12 would be an optimal, optional feature of the invention.

In use, assuming that the shaker top 14 is to be used to mix a beverage having solid and liquid constituents, such as in the preparation of powdered baby formula, the liquid (water) is first poured into the baby bottle to the measuring line indicated on the bottle. The solid constituents, such as the powdered milk, in then scooped from the powdered milk can and emptied into the baby bottle which places the milk particles on top of the liquid. The mixing disc 10 is then inserted into the mixing chamber 12 as shown in FIG. 1, 2 and 5 by holding the center post 22 with the thumb and forefinger and forcing it upwardly into the support wedges 34 inside the mixing chamber 12. This allows the disc 10 to be snapped into place and frictionally held in a jam-fitting-position. This facilitates the transfer of the shaker top 14 to other bottles when preparing more than one bottle of formula without the need to touch the mixing disc 10. This avoids contamination of the sterile formula. When the mixing disc 10 is in place, the top/bottom of the outer rim of the disc 36 is parallel to the horizontal plate 60 and the center post 22 is perpendicular to the horizontal plane 60. With the shaker top assembled 14, the internal screwthreads 24 on the mixing chamber 12 are mated to the external screwthreads on a baby bottle and the shaker top 14 is then attached to the rim of the baby bottle 28 with a twisting motion. The indentions around the bottom of the mixing chamber 56 improve the grip. When the shaker top 14 is threaded onto the bottle neck, the mixing disc 10 rests above the rim of the bottle 28 inside the mixing chamber 12.

The attached shaker top 14 and baby bottle is then grasped and shaken. The assembly may be grasped in one hand, with the thumb and the little finger or ring finger (or both) embracing the bottle 16 while the forefinger reaches over the top of the mixing chamber 48, and the index finger bears against the side wall 46 of the chamber.

The assembled shaker top 14 and bottle 16 are shaken in the usual manner to throw the liquid and solid contents of same longitudinally in the assembly. In so doing, the liquid and solid constituents, when moving from the baby bottle 16, are directed against the underside of the mixing disc 10 causing the solid particles to fragment upon impact against the shear points 40. The liquid and solid constituents pass through the disc 10 for entry into the mixing chamber 12 and impinge against the inside surface of the chamber 52; wherein the contents are deflected towards the center of the mixing chamber 12 so that on reversal of movement of the assembled shaker top and bottle, such liquids and solids in moving in the opposite direction are applied against the upper side of the mixing disc 10 to aid in the break up of the solid members by forcing same through the pointed arms on the disc 20 and back into the bottle. The shaking action provides extensive physical contact with the solid and liquid materials involved. If the solid materials are the type that tend to lump when wetted by liquid, which is typical of powdered formula, the lumps will be carried by the agtitated liquid in the mixing chamber 12 as it flows back and forth between the bottle and said chamber. The swiching liquid will cause those lumps to impinge against the shear points 40 on the mixing disc and slide down the smooth side of the arms 42 thus accelerating the wearing away or breaking up of the lumps and preventing small wetted particles from sticking to the arms 20. Furthermore, the manual shaking of the shaker causes a back and forth movement of the liquid through the mixing disc 10. The direction of movement of the liquid is, to a large measure, parallel to the longitudinal axis of the shaker assembly 44. Liquid that impinges on the arms 20 of the disc during the shaking will enhance the dissolving process thereby producing a beverage of smooth consistency which is easier for a small infant to digest. Liquid that remains in the mixing chamber 12 returns to the baby bottle when placed in an upright position.

When the shaking is completed, the shaker top can either be removed or left in place for storage in the refrigerator. If the top is left in place, it will function as a normal closing for a bottle. Formula stored in such a closed bottle can be used to make baby cereal or other baby food preparations, or poured into a cup for a baby to drink. To remove the top, the operator grasps the exterior of the shaker top 14, presumably around handling indentions 56, and twists the shaker top according to the mated screwthreads 28 and 24 to remove top from bottle. The shaker top 14 can then either be transferred to another baby bottle for shaking or inverted and rested on the closed end 48 to allow drippage to be caught inside the chamber 12.

The open end of the baby bottle then fully exposes the mixed beverage inside and permits the attachment of a nipple assembly to the rim of the bottle 28 if so desired. The formula has hence been prepared directly in the bottle with no unnecessary transferring of milk to prevent the possibility of contamination and with cool water which lessens the chance of bacterial growth.

It will thus be seen that the invention provides a shaker top of two simplified components that not only provides improved dispersion of the solid constituents of a beverage in the final mixture, but allows this to be done in the feeding vessel, i.e. baby bottle. The resulting formula is smooth and lump-free which allows for easier digestion of the milk by a small infant and avoids the possibility of these lumps becoming plugged in the nipple hole. This improved method for preparing infant milk lessens the potential for contamination through excess handling that occurs when the formula is prepared in an alternate container and transferred to a baby bottle. This device provides superior results even when cool water is used in the preparation which does not promote bacterial growth and thereby preserves the nutritional quality and freshness of the milk. Furthermore, the shaker top can be used as a closure for the baby bottle during storage of the prepared formula. This device produces safer infant milk through the ability to mix the powdered formula with bottled purified water that is cool rather than boiled tap water. The indentions around the exterior of the shaker top provides ease in attaching and removing the device from a bottle, and the design of the mixing disc enhances the effects of the shaking process and speeds up the dispersion of the food particles into the liquid.

While my above description contains many specifications, these should not be construed as limitations on the scope of the invention, but rather as an exemplification of one preferred embodiment thereof. Many other variations are possible. For example, reference has been made that the primary use of this invention is to mix powdered baby formula and water together. It should be noted, however, that this device when attached to a bottle could be used to mix any beverage requiring dispersion of food particles into liquid. A further ramification of this invention would to indicate graduated measurement lines indicating capacity on the mixing chamber, such as ounces, so that the chamber could be used as a measuring device. Should the chamber be made of clear plastic, this measuring feature would be enhanced. Further, the mixing disc and chamber could be made available in different colors with different cosmetic designs and shapes, which function according to the basic invention, to aid in its marketing. Another ramification of this design would be to allow the mixing disc to rest upon the rim of the baby bottle rather than having it snap-fit into the mixing chamber. Those skilled in the art will envision many other possibile designs within the scope of this invention. For example, skilled artisians will readily be able to change the dimensions and shape of the various embodiments. Such other designs would include a mixing disc with holes in it instead of elongated arms; or a planar disc adaptable to a nipple ring that has sharp shears pointing downward into the baby bottle to break apart the solid particles as they inpinge upon the shears. Accordingly, the scope of the invention should be determined not by the embodimens illustrated, but by the appended claims and their legal equivalents.

I claim:

1. A drink shaker for attachment to a baby bottle comprising:
   a mixing chamber, comprising an open end with internal screwthreads proportioned and dimensioned to permit the attachment of said mixing chamber to said baby bottle,
   in combination with said mixing chamber, a mixing means for fragmenting and dispersing food particles into liquid, proportioned and dimensioned to fit within said mixing chamber with a plurality of uniformly spaced arms radiating from a center post; said arms are diamond-shaped creating shear points and straight sides between said shear points whereby the break-up of food is enhanced and the clumping of food in crevices avoided.

2. The shaker top of claim 1 wherein said mixing means is a removable disc.

3. The shaker top of claim 1 wherein said mixing chamber comprises a series of internal support wedges positioned above said screwthreads dimensioned and proportioned to retain said mixing means within said mixing chamber in position above the rim of said baby bottle.

4. The shaker top of claim 1 wherein said mixing chamber comprises a series of handling indentions around the lower external perimeter of said mixing chamber and a flat top surface of said mixing chamber which is parallel to the horizontal plane and with a diameter slightly smaller than the diameter of siad baby bottle.

5. A drink shaker top for use with a baby bottle comprising:
   a mixing chamber comprising internal screwthreads to allow attachment to said baby bottle,
   a mixing disc comprising a center post, said post projecting transversely beyond the plane of said disc whereby the post can be grasped for ease in removing and handling, with a plurality of diamond shaped arms having shear points with straight sides radiating from said post; said mixing disc is dimensioned and proportioned to fit inside said mixing chamber whereby said mixing disc disperses solid food particles into liquid.

6. The shaker top of claim 5 wherein said mixing disc is of a circular configuration.

7. The shaker top of claim 5 wherein said arms on said mixing disc have a length approximately the radius of the opening to said baby bottle whereby clumping of food particles is discouraged and dispersion of solid foods enhanced.

8. The shaker top of claim 5 wherein said mixing chamber is of a domal configuration and defines a circumambient side, closed at one and of same and open at the other end of same, the open end circumferentially proportioned to accommodate mating of said internal screwthreads to external screwthreads on said baby bottle.

9. The shaker top of claim 5 wherein said mixing chamber includes a series of formed support wedges which are an integral part of the interior of said mixing chamber whereby said support wedges internally retain said mixing disc in position above the rim of said baby bottle.

10. The shaker top of claim 9 wherein said support wedges are positioned above said internal screwthreads and provide a means to frictionally hold said mixing disc in jam-fitting-position by narrowing the internal circumference of said mixing chamber to a size slightly smaller than the circumference of said mixing disc and that of said baby bottles.

11. The shaker top of claim 5 wherein a closed top end of said mixing chamber is flat to provide a rest surface for said mixing chamber when inverted with a circumference slightly smaller than the opening of said baby bottle.

12. The shaker top of claim 5 wherein external indentations are formed on said mixing chamber whererby handling is improved.

13. A shaker top comprising:
   a dome-shaped container, said container comprising internal screwthreads proportioned and dimensioned to allow its attachment to a baby bottle,
   a dispersion means proportioned and dimensioned to fit inside said container; said dispersion means is disc-shaped with a plurality of uniformly spaced arms radiating from a center post, said arms are diamond shaped that form shear points and straight sides between said shear points whereby upon impingement of food particles of same, said particles are broken apart and dispersed into liquid.

14. A shaker top of claim 13 wherein said container provides a mixing chamber whereby said solid and liquid constituents impinge against said chamber walls to enhance the blending process while attached to said baby bottle.

15. A shaker top of claim 13 wherein said container is formed to provide a series of support wedges positioned above said screwthreads whereby said dispersion means is proportioned and dimensioned to be retained in position above said baby bottle in jam-fitting-relation to said container.

* * * * *